US011685335B2

(12) United States Patent
Noda et al.

(10) Patent No.: US 11,685,335 B2
(45) Date of Patent: Jun. 27, 2023

(54) IGNITER ASSEMBLY AND MOLDING METHOD FOR HOLDING PART

(71) Applicant: DAICEL CORPORATION, Osaka (JP)

(72) Inventors: Akifumi Noda, Tokyo (JP); Kenji Fukumoto, Tokyo (JP); Shinichiro Ukita, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 145 days.

(21) Appl. No.: 17/435,921

(22) PCT Filed: Sep. 26, 2019

(86) PCT No.: PCT/JP2019/037959
§ 371 (c)(1),
(2) Date: Sep. 2, 2021

(87) PCT Pub. No.: WO2020/179113
PCT Pub. Date: Sep. 10, 2020

(65) Prior Publication Data
US 2022/0185223 A1    Jun. 16, 2022

(30) Foreign Application Priority Data

Mar. 6, 2019    (JP) .............................. JP2019-040862

(51) Int. Cl.
*B60R 21/264*    (2006.01)
*B60R 21/26*    (2011.01)

(52) U.S. Cl.
CPC ..................... *B60R 21/2644* (2013.01); *B60R 2021/26041* (2013.01); *B60R 2021/2648* (2013.01)

(58) Field of Classification Search
CPC ............. B60R 21/264; B60R 21/2644; B60R 2021/26029; B60R 2021/26041; B60R 2021/2642; B60R 2021/2648
See application file for complete search history.

(56) References Cited

U.S. PATENT DOCUMENTS 5,556,132 A * 9/1996 Sampson ............ B60R 21/2644
422/165
5,596,163 A * 1/1997 Caflisch ............. B60R 21/2644
102/202.7

(Continued)

FOREIGN PATENT DOCUMENTS

JP    2006284151 A * 10/2006 .............. F42B 3/103
JP    2013166494 A *  8/2013 ........... B60R 21/264

(Continued)

OTHER PUBLICATIONS

International Preliminary Report on Patentability and Written Opinion of the International Searching Authority for International Application No. PCT/JP2019/037959, dated Sep. 16, 2021.

(Continued)

*Primary Examiner* — Barry Gooden, Jr.
(74) *Attorney, Agent, or Firm* — Birch, Stewart, Kolasch & Birch, LLP

(57) ABSTRACT

An igniter assembly includes an igniter, a collar, and a holding part, a cup body having a cylindrical peripheral wall and a lid wall and a closing part defining an accommodating space with the cup body, the peripheral wall is sectioned, in an axial direction, into a contact region in contact with the closing part and a noncontact region not in contact with the closing part, the holding part includes a base part covering the contact region and a surrounding wall formed continuously to the base part and surrounding the noncontact region, and a fragile part is formed in the holding part between a first area including at least a part of the base part and a second (Continued)

area including a tip end of the surrounding wall, and thus the second area deforms radially outward preferentially when a load is applied to the surrounding wall by the igniter activated.

15 Claims, 12 Drawing Sheets

(56) References Cited

U.S. PATENT DOCUMENTS

| | | | | |
|---|---|---|---|---|
| 6,007,096 | A * | 12/1999 | Shirk | F42B 3/125 |
| | | | | 280/736 |
| 6,073,963 | A * | 6/2000 | Hamilton | B60R 21/26 |
| | | | | 280/741 |
| 6,230,624 | B1 * | 5/2001 | Chatley, Jr. | C06B 21/005 |
| | | | | 149/93 |
| 6,526,890 | B1 * | 3/2003 | Vidot | F42B 3/121 |
| | | | | 102/202.7 |
| 6,761,118 | B2 * | 7/2004 | Laucht | F42B 33/025 |
| | | | | 86/1.1 |
| 6,936,303 | B1 * | 8/2005 | Katsuda | F42B 3/12 |
| | | | | 29/595 |
| 8,590,930 | B2 * | 11/2013 | Mitsunabe | F42B 3/103 |
| | | | | 280/741 |
| 9,656,626 | B2 * | 5/2017 | Ohsugi | B60R 21/26 |
| 10,060,452 | B2 * | 8/2018 | Yamada | F15B 15/19 |
| 2002/0152919 | A1 * | 10/2002 | Laucht | F42B 3/195 |
| | | | | 102/530 |
| 2004/0226472 | A1 * | 11/2004 | Oda | F42B 3/195 |
| | | | | 102/205 |
| 2004/0229179 | A1 * | 11/2004 | Enzmann | F42B 3/125 |
| | | | | 431/258 |
| 2007/0273132 | A1 * | 11/2007 | Smith | B60R 21/2644 |
| | | | | 280/736 |
| 2011/0101651 | A1 * | 5/2011 | Bierwirth | B60R 21/2644 |
| | | | | 280/741 |
| 2011/0221174 | A1 * | 9/2011 | Cox | B60R 21/264 |
| | | | | 165/104.19 |
| 2013/0276663 | A1 * | 10/2013 | Ohsugi | B60R 21/2644 |
| | | | | 102/530 |
| 2016/0052486 | A1 | 2/2016 | Ohsugi et al. | |
| 2016/0214564 | A1 | 7/2016 | Imoto et al. | |
| 2019/0054891 | A1 * | 2/2019 | Tanaka | B60R 21/2644 |
| 2020/0139925 | A1 * | 5/2020 | Koyama | B60R 21/264 |

FOREIGN PATENT DOCUMENTS

| | | |
|---|---|---|
| JP | 2015-74413 A | 4/2015 |
| WO | WO 2014/157648 A1 | 10/2014 |

OTHER PUBLICATIONS

International Search Report for International Application No. PCT/JP2019/037959 dated Dec. 24, 2019.

* cited by examiner

IGNITER ASSEMBLY AND MOLDING METHOD FOR HOLDING PART

TECHNICAL FIELD

The present invention relates to an igniter assembly in a gas generator and a molding method for a holding part in the igniter assembly.

BACKGROUND ART

Typically, an igniter is widely used as a starter for an airbag gas generator and the like. When the igniter is attached to the gas generator, a method of fixing the igniter to a collar attached to the housing side via a holding part made of a resin material is known. Regarding this, there is a disclosure of a gas generator in which an annular member is disposed around the igniter to prevent a gas generating agent from being disposed around the igniter and make it harder for unburned charge and combustion delay of the gas generating agent to be generated (e.g., Patent Document 1).

CITATION LIST

Patent Document

Patent Document 1: JP 2015-074413 A

SUMMARY OF INVENTION

Technical Problem

Here, when the gas generator is in operation, the igniter is operated, and the metal cup containing the ignition charge for igniting the combustion agent bursts, whereby the flame is released. In a case where a structure for fixing the igniter to the collar via the holding part made of a resin material is employed, the holding part deforms by a load applied to the holding part when the igniter is in operation, and cracks or breakage may occur in an area for fixing the igniter with the collar at the holding part. In such a case, depending on the state of the crack or breakage, there is a risk that the igniter is not sufficiently held, causing the igniter to be lifted from the holding part or the sealability as a gas generator to be impaired.

The technology of the present disclosure has been made in view of the problems described above, and an object of the present disclosure is to provide an igniter assembly capable of suppressing a defect caused by an occurrence of a crack or breakage in a holding part for fixing the igniter to a collar when the igniter is in operation.

Solution to Problem

To solve the above problems, the technology disclosed herein employs the following configuration. That is, an igniter assembly according to the present disclosure includes: an igniter including an accommodating space for accommodating an ignition charge for igniting a combustion agent; a collar for supporting the igniter; and a holding part formed of a resin material for fixing the igniter to the collar, wherein the igniter includes a cup body provided with a peripheral wall having a cylindrical shape and a lid wall for closing one end of the peripheral wall, the cup body being provided such that the lid wall is positioned on a discharge direction side of a combustion product of the ignition charge when the igniter is activated and a closing part disposed and thus closing an opening formed at the other end of the cup body, the closing part therein defining the accommodating space together with the cup body, the peripheral wall is sectioned, in an axial direction of the peripheral wall, into a contact region in contact with the closing part and a noncontact region being a region on a side of the lid wall relative to the contact region and not in contact with the closing part, the holding part includes a base part for fixing the igniter to the collar by covering a periphery of the contact region and a surrounding wall having an annular shape formed continuously to the base part and configured to prevent the combustion agent from being disposed around the noncontact region by surrounding the noncontact region, and a fragile part is formed in the holding part between a first area including at least a part of the base part, and a second area, which is an area on a side of the discharge direction relative to the first area, the second area including a tip end of the surrounding wall, and thus the second area deforms radially outward preferentially compared with the first area when a load is applied to the surrounding wall by the igniter activated.

According to the igniter assembly of the present disclosure, the surrounding wall formed in the holding part prevents the combustion agent from being disposed around the noncontact region. That is, if it were not for the surrounding wall, a space would be formed around the cup body protruding from the upper end surface of the collar to the lid wall side. Here, if the combustion agent is disposed around the noncontact region when the igniter is in operation, the combustion agent is positioned off from the discharge direction of the combustion product with respect to the igniter. As a result, there is a risk that the combustion agent does not sufficiently burn, and unburned charge or combustion delay of the combustion agent is generated. On the other hand, according to the igniter assembly of the present disclosure, since the combustion agent is prevented from being disposed around the noncontact region, it is possible to suppress generation of the unburned charge and combustion delay of the combustion agent after the igniter is in operation. As a result, it is possible to improve the output performance of the gas generator. Since the surrounding wall plays a role of a cushion against the combustion agent, it is possible to prevent rattling of the combustion agent after the gas generator is assembled, and it is possible to easily assemble the gas generator.

In addition, the holding part of the igniter assembly of the present disclosure is formed with a fragile part and thus the second area deforms radially outward preferentially compared with the first area when a load is applied to the surrounding wall by the igniter activated. Thus, the energy due to the load applied to the surrounding wall is easily consumed for the deformation of the second area, and hence the first area is suppressed from greatly deforming. As a result, a crack or breakage is suppressed from occurring in the first area when the igniter is in operation. Here, since the first area includes at least a part of the base part for fixing the igniter to the collar, by suppressing generation of a crack or breakage in the first area, it is possible to suppress generation of defects such as lifting of the igniter and reduction in sealability.

The combustion agent of the present disclosure includes: a gas generating agent for generating a combustion gas for inflating an airbag; and a transfer charge for burning the gas generating agent. The deformation of the second area may be accompanied by fracture or rupture, and the second area may be separated from the first area by ductile fracture or brittle fracture.

In the igniter assembly, the above-mentioned fragile part may be formed as follows. That is, in the igniter assembly, the surrounding wall may have a thick part and a thinned part circumferentially extending and having a thickness in a radial direction thinner than the thick part, and the fragile part may be formed as the thinned part. Thus, stress generated in the holding part by the load applied to the surrounding wall when the igniter is in operation can be concentrated in the thinned part, and the second area can be deformed preferentially than the first area.

When the fragile part is formed as a thinned part in the igniter assembly, the thinned part may be formed by forming, on the surrounding wall, a groove part extending along a circumferential direction of the surrounding wall and recessed in the radial direction. According to this, since the groove is formed on the surrounding wall, when a load is applied to the surrounding wall, the surrounding wall easily deforms and thus falls radially outward. As a result, the second area can be preferentially deformed more easily than the first area. The groove may be formed on either the inner peripheral surface or the outer peripheral surface of the surrounding wall.

In the igniter assembly, when the thinned part is formed by the groove part described above, a depth in the radial direction from the outer peripheral surface of the thick part to the bottom part of the groove part is preferably equal to or greater than ⅓ and equal to or less than ¾ of a thickness of the thick part in the radial direction. By doing so, it becomes easy to deform the second area more preferentially than the first area.

In the igniter assembly, the above-mentioned fragile part may be formed as follows. That is, in the igniter assembly, the first area may be formed of a first resin material, the second area may be formed of a second resin material having a slower curing timing than the first resin material, and the fragile part may be formed as an interface between the first area and the second area. According to this, the interface is formed between the first area and the second area by curing, at different curing timings, the first resin material forming the first area and the second resin material forming the second area. The curing timing can be regarded as the molding timing. Thus, the first area is first injection molded by the first resin material, and, after curing, injection molded by the second resin material from above. Thus, stress generated in the holding part by the load applied to the surrounding wall when the igniter is in operation can be concentrated in the interface described above. As a result, the second area can be easily deformed radially outward preferentially compared with the first area.

When the fragile part is formed as an interface between the first area and the second area in the igniter assembly, the holding part may be formed by the following molding method. That is, the molding method for the holding part of the present disclosure may include: molding the first area by melting and curing the first resin material; and molding the second area by melting and curing the second resin material after curing the first resin material.

When the fragile part is formed at the interface between the first area and the second area in the igniter assembly, the first resin material may have a higher melting point than that of the second resin material. Thus, in molding the second area, the first resin material having cured can be suppressed from melting when the second resin material in a molten state is poured. As a result, it is possible to form the interface between the first resin material and the second resin material, and it is possible to suppress deformation of the first area due to melting of the first resin material.

Note that the first resin material and the second resin material mentioned above may be the same type of resin material or may be different types of resin material.

In the igniter assembly, the surrounding wall may form a gap having an annular shape with the noncontact region of the peripheral wall, and the size of the gap may be smaller than the size of the combustion agent. According to this, the impact applied from the cup body to the surrounding wall when the igniter is in operation can be buffered by the gap. By making the size of the gap smaller than the size of the combustion agent, it is possible to suppress the combustion agent from entering the gap.

In the igniter assembly, the surrounding wall may be formed by a plurality of intermittent walls arrayed annularly at predetermined gaps in a circumferential direction, and the predetermined gap may be formed smaller than a size of the combustion agent. According to this, since the surrounding wall is formed by the plurality of intermittent walls, it is possible to reduce the cross-sectional area in the cross section orthogonal to the axial direction of each intermittent wall. Thus, each intermittent wall can be easily deformed. As a result, when a load is applied to the surrounding wall, the second area can be easily deformed and thus separated from the igniter more preferentially than the first area. By making the predetermined gap smaller than the size of the combustion agent, it is possible to suppress the combustion agent from entering the gap formed between adjacent intermittent walls. When the surrounding wall is formed by the plurality of intermittent walls, the second area can be further easily deformed by making the predetermined gap shorter than a circumferential length of one of the intermittent walls.

Advantageous Effects of Invention

According to the technology of the present disclosure, when the igniter is in operation, it is possible to suppress a defect caused by an occurrence of a crack or breakage in a holding part for fixing the igniter to a collar.

DESCRIPTION OF EMBODIMENTS

An igniter assembly in a gas generator according to an embodiment of the present disclosure will be described below with reference to the drawings. Note that each of the configurations, combinations thereof, and the like in each embodiment is an example, and various additions to the configuration, omissions, substitutions, and other changes may be made as appropriate without departing from the spirit of the present invention. The present invention is not limited by the embodiments and is limited only by the claims.

First Embodiment

Figure 1:
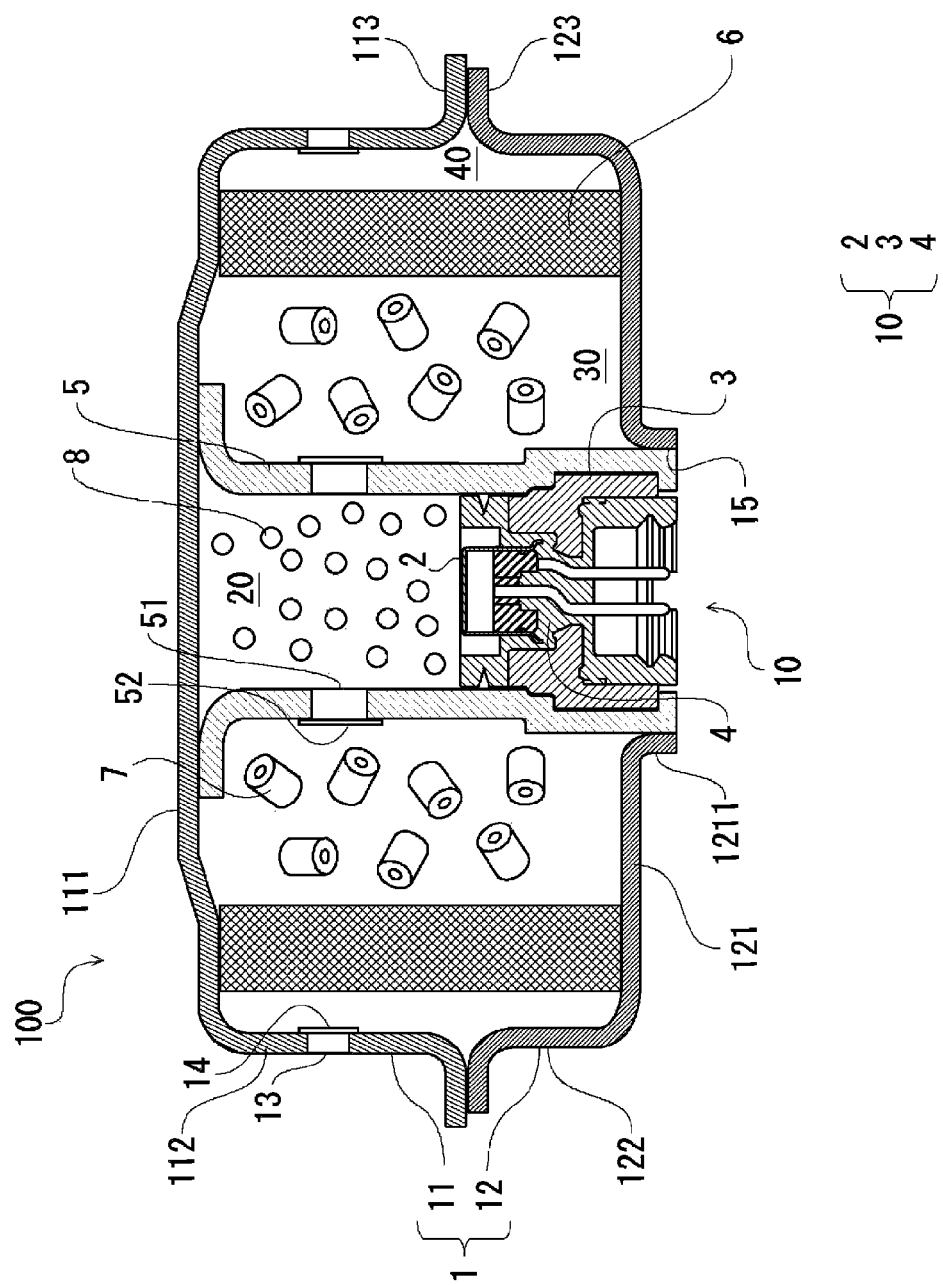
FIG. 1 is an axial cross-sectional view of an airbag gas generator using an igniter assembly according to a first embodiment.

FIG. 1 is an axial cross-sectional view of an airbag gas generator (hereinafter, gas generator) 100 using an igniter assembly 10 according to the first embodiment of the present disclosure. As illustrated in FIG. 1, the gas generator 100 includes a housing 1, an igniter 2, a collar 3, a holding part 4, an inner cylinder 5, and a coolant filter 6. The igniter 2, the collar 3, the holding part 4, the inner cylinder 5, and the coolant filter 6 are disposed in an inner space of the housing 1. In the present description, the configuration including the igniter 2, the collar 3, and the holding part 4 is referred to as the igniter assembly 10. The gas generator 100 is configured to burn a gas generating agent 7 filled in the housing 1 by the igniter 2 activated, and to inflate an airbag (not illustrated) by discharging the combustion gas, which is a combustion product thereof, to the outside of the housing 1. The components of the gas generator 100 will be described below.

[Housing]

The housing 1 is formed in a short cylindrical shape with both axial ends blocked by joining a metal upper shell 11 and a metal lower shell 12 each formed in a bottomed substantially cylindrical shape in a state where their opening ends facing each other. Here, an axial direction of the housing 1 is defined as a vertical direction of the gas generator 100, where the upper shell 11 side (i.e., the upper side in FIG. 1) is defined as an upper side of the gas generator 100, and the lower shell 12 side (i.e., the lower side in FIG. 1) is defined as a lower side of the gas generator 100.

The upper shell 11 has a substantially disc-shaped top plate portion 111, an outer peripheral wall portion 112 extending downward from the peripheral edge of the top plate portion 111, and a flange portion 113 extending radially outward from the tip end portion of the outer peripheral wall portion 112. The lower shell 12 has a substantially disc-shaped bottom plate portion 121, an outer peripheral wall portion 122 extending upward from the peripheral edge of the bottom plate portion 121, and a flange portion 123 extending radially outward from the tip end portion of the outer peripheral wall portion 122. Such upper shell 11 and the lower shell 12 are molded by pressing a stainless steel plate. The upper shell 11 and the lower shell 12 form the housing 1 with the flange portion 113 and the flange portion 123 overlapped and joined by laser welding or the like.

A plurality of gas discharge ports 13 are formed side by side in the circumferential direction on the outer peripheral wall portion 112 of the upper shell 11. The gas discharge port 13 is blocked by a sealing tape 14. As the sealing tape 14, aluminum foil or the like having one side coated with an adhesive member is used. Thus, the airtightness of the housing 1 is ensured.

As illustrated in FIG. 1, the bottom plate portion 121 of the lower shell 12 is provided at its center with an opening cylindrical portion 1211 protruding downward. The inner wall of the opening cylindrical portion 1211 forms an opening 15 communicating the inner space and the outer space of the housing 1.

[Inner Cylinder]

The inner cylinder 5 has a cylindrical shape with both ends open, and is disposed in an attitude where the center axis coincides with the vertical direction (i.e., the axial direction of the housing 1). The inner cylinder 5 is formed of a stainless steel pipe. As illustrated in FIG. 1, the lower end of the inner cylinder 5 is fitted into the opening 15, and at the lower end, the outer peripheral surface of the inner cylinder 5 abuts against the inner peripheral surface of the opening 15. The upper end of the inner cylinder 5 abuts against the top plate portion 111 of the upper shell 11. Thus, the inner space of the housing 1 is sectioned radially by the inner cylinder 5. Of the inner space of the housing 1, the inside of the inner cylinder 5 defines a cylindrical transfer chamber 20 in which the igniter assembly 10 is disposed and a transfer charge 8 as a combustion agent is filled, and the outside of the inner cylinder 5 defines an annular combustion chamber 30 in which the gas generating agent 7 is filled. In the inner cylinder 5, a plurality of transfer holes 51, which are holes for communicating the transfer chamber 20 and the combustion chamber 30, are formed side by side in the circumferential direction. The transfer hole 51 is blocked by a sealing tape 52. Thus, the airtightness of the transfer chamber 20 is ensured. The inner cylinder 5 and the housing 1 are joined to each other, for example, by being welded at their contact portions.

[Coolant Filter]

The coolant filter 6 is annularly disposed surrounding the gas generating agent 7 in the combustion chamber 30, and defines an annular gap 40 between the outer peripheral wall portion 112 and the outer peripheral wall portion 122 of the housing 1. The coolant filter 6 is formed by stacking stainless steel flat metal wires in the radial direction and compressing them in the radial direction and axial direction.

In the thus configured gas generator 100, when a sensor (not illustrated) senses an impact, a predetermined signal is sent to the igniter 2, the igniter 2 is operated, and thus the transfer charge 8 in the transfer chamber 20 is ignited. The combustion of the transfer charge 8 generates a high-temperature flame in the transfer chamber 20. This flame breaks through the sealing tape 52, is jetted from the transfer hole 51 into the combustion chamber 30, and ignites the gas generating agent 7. Then, high-temperature and high-pressure gas is generated by combustion of the gas generating agent 7, and this combustion gas passes through the entire region of the coolant filter 6. At this time, the coolant filter 6 cools the combustion gas generated in the combustion chamber 30 and filters combustion residue. The combustion gas cooled and purified by the coolant filter 6 passes through the gap 40, breaks through the sealing tape 14, is jetted from the gas discharge port 13, and flows into an airbag (not illustrated). This causes the airbag to inflate, forming a cushion between the occupant and the rigid structure, and protecting the occupant from the impact. As the gas generating agent 7, for example, a single-pore cylindrical one made of guanidine nitrate (41 wt. %), basic copper nitrate (49 wt. %), and a binder or an additive can be used. As the transfer charge 8, for example, one made of nitroguanidine (34 wt. %) and strontium nitrate (56 wt. %) can be used.

[Igniter Assembly]

Figure 2:
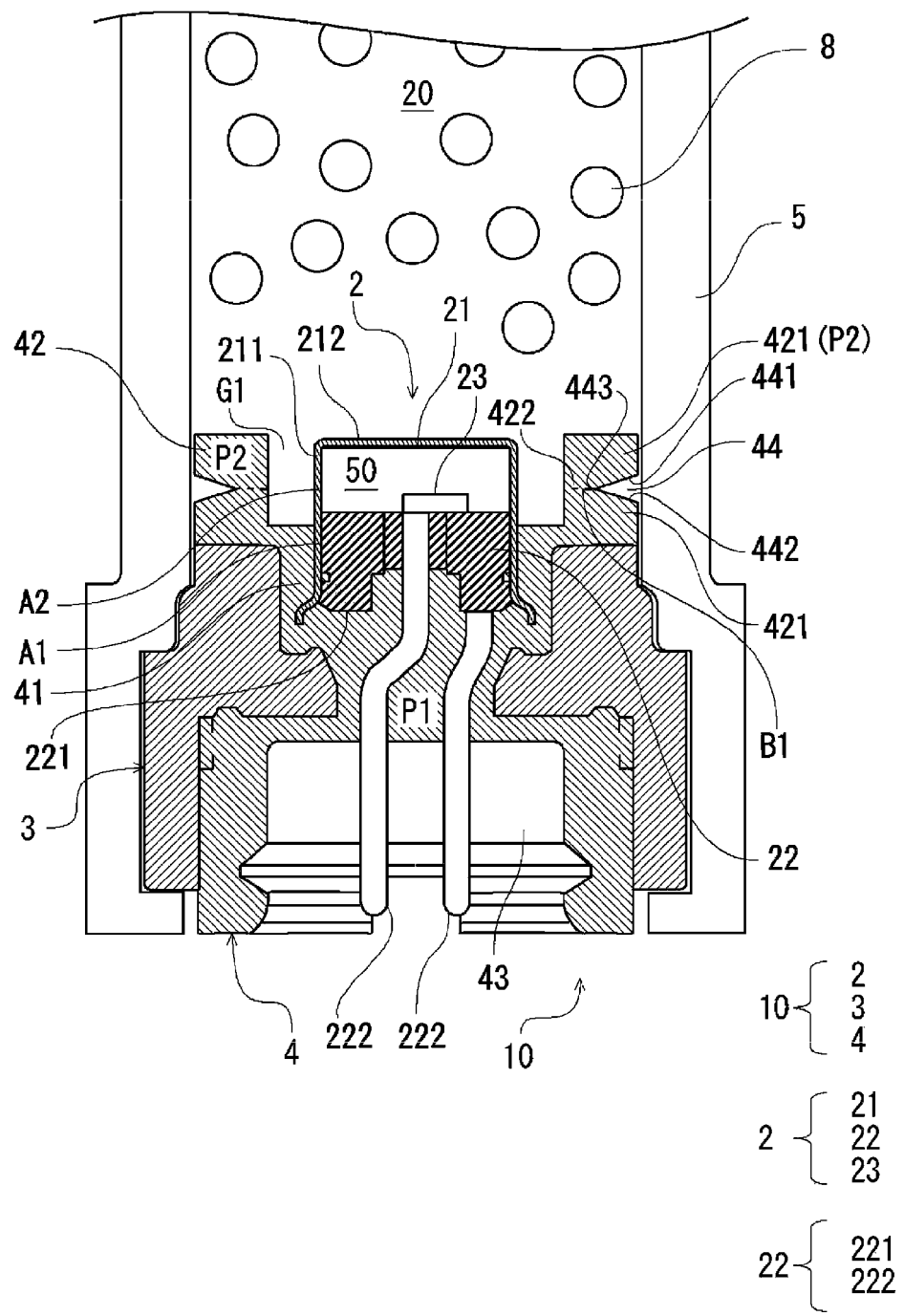
FIG. 2 is a view illustrating a structure of the igniter assembly according to the first embodiment.

Next, the igniter assembly 10 will be described. FIG. 2 is a view illustrating the structure of the igniter assembly 10 according to the first embodiment. The igniter assembly 10 includes the igniter 2 including an ignition chamber 50 as an accommodating space for accommodating an ignition charge (not illustrated) for igniting the transfer charge 8, the collar 3 for supporting the igniter 2, and the holding part 4 formed of a resin material for fixing the igniter 2 to the collar 3.

[Igniter]

The igniter 2 burns the ignition charge in the ignition chamber 50 by an ignition current supplied from the outside of the transfer chamber 20. The igniter 2 is fixed to the lower part of the transfer chamber 20 by the holding part 4. When the igniter 2 is operated, the ignition charge burns, the combustion product thereof is discharged upward, and the transfer charge 8 is ignited. Hereinafter, the direction in which the combustion product is discharged from the igniter 2 (upward in this example) is sometimes referred to as the discharge direction.

As illustrated in FIG. 2, the igniter 2 includes: a cup body 21 having one end blocked and the other end open; and a closing part 22 disposed to block the opening formed at the other end of the cup body 21 and defining the ignition chamber 50 together with the cup body 21.

The cup body 21 is formed in a cup shape by a cylindrical peripheral wall 211 and a lid wall 212 closing one end of the peripheral wall 211. The peripheral wall 211 is disposed with the center axis thereof coincides with the vertical direction. The lid wall 212 is formed continuously to the peripheral wall 211, and constitutes the upper wall of the ignition chamber 50 by closing the upper end portion of the peripheral wall 211. The cup body 21 is disposed such that the lid wall 212 is positioned on the discharge direction side of the combustion product of the ignition charge when the igniter 2 is in operation. This cup body 21 has a double structure in which a metal inner cup and a resin outer cup are overlapped. However, the material of the cup body 21 is not limited to this.

The closing part 22 has a metal header 221 disposed at the lower end of the peripheral wall 211 and a pair of conductive pins 222 and 222 extending downward from the metal header 221. The metal header 221 is formed of a metal material in a substantially cylindrical shape, and is in contact with the peripheral wall 211 on the outer peripheral surface thereof. A vertically penetrating through-hole is formed in the central part of the metal header 221. One of the pair of conductive pins 222 and 222 is joined to the metal header 221 via an insulator in a state of being inserted into the through-hole of the metal header 221. A bridge wire 23, which is a resistor that electrically connects the conductive pin 222 and the metal header 221, is wired to the bottom part of the ignition chamber 50. The other of the pair of conductive pins 222 and 222 is joined to the lower surface of the metal header 221. The closing part 22 forms the lower wall of the ignition chamber 50 by closing the lower end of the peripheral wall 211.

Here, as illustrated in FIG. 2, since the closing part 22 is disposed inside the cup body 21 and thus it closes the opening of the cup body 21, the peripheral wall 211 of the cup body 21 is sectioned, in the axial direction, into a contact region A1 in contact with the closing part 22 and a noncontact region A2 being a region on the discharge direction side relative to the contact region A1 and not in contact with the closing part 22.

The igniter 2 is disposed in the transfer chamber 20 and thus an external power source can be connected to the pair of conductive pins 222 and 222. When the igniter 2 is in operation, a voltage is applied between the two conductive pins 222 and 222 by the external power source, a current flows in the bridge wire 23, and the ignition charge in the ignition chamber 50 burns by Joule heat generated in the bridge wire 23. With this, the pressure in the ignition chamber 50 rises, causing the cup body 21 to burst, and a high-temperature flame, which is a combustion product of the ignition charge, is discharged upward, which is the discharge direction. Thus, the transfer charge 8 in the transfer chamber 20 is ignited.

[Collar]

The collar 3 is formed of a metal material and has a cylindrical shape surrounding a region below the ignition chamber 50 in the igniter 2. However, the material of the collar 3 is not limited to a metal material. The outer peripheral surface of the collar 3 abuts against the inner peripheral surface of the inner cylinder 5. As illustrated in FIG. 2, the collar 3 is fixed to the lower part of the transfer chamber 20 by crimping the lower end of the inner cylinder 5 in a state where the collar 3 is fitted in the inner cylinder 5. The collar 3 may be integrally molded with the inner cylinder 5 and the lower shell 12.

[Holding Part]

As illustrated in FIG. 2, the resin holding part 4 is interposed between the igniter 2 and the collar 3, whereby the igniter 2 is fixed to the collar 3. The holding part 4 has: a base part 41 for fixing the igniter 2 to the collar 3 by covering the periphery of the contact region A1; and an annular surrounding wall 42 formed continuously to the base part 41 and configured to prevent the transfer charge 8 from being disposed around the noncontact region A2 by surrounding the noncontact region A2.

By covering the outer peripheral surface of the contact region A1 in the peripheral wall 211, the lower surface of the metal header 221, the upper surface of the collar 3, and the inner peripheral surface of the collar 3, the base part 41 fixes the collar 3 and the holding part 4 to each other and maintains the airtightness of the transfer chamber 20. A connector insertion space 43 into which a connector (not illustrated) for supplying power from an external power supply to the conductive pins 222 and 222 can be inserted is formed at the lower end of the base part 41. The base part 41 partially covers and holds the pair of conductive pins 222 and 222 and thus the lower end of the pair of conductive pins 222 and 222 is exposed in the connector insertion space 43. The base part 41 maintains insulation between the pair of conductive pins 222 and 222.

The surrounding wall 42 is formed as an annular area continuous to the base part 41 and extending upward from the base part 41. The length from the base end to the tip end (upper end) of the surrounding wall 42 is substantially equal to the axial length of the noncontact region A2. However, the technology disclosed in the present application is not limited this. The surrounding wall 42 has a function as a spacer. Since the surrounding wall 42 surrounds the noncontact region A2 from the radial outside, the transfer charge 8 is prevented from being disposed in the radial periphery of the noncontact region A2, more specifically, between the noncontact region A2 and the inner peripheral surface of the inner cylinder 5 when the igniter assembly 10 is disposed at a predetermined area of the gas generator. That is, at least a part of the outer peripheral surface of the surrounding wall 42 comes into contact with the inner peripheral surface of the inner cylinder 5 of the gas generator 100, or a gap that does not let the transfer charge 8 enter is formed between the outer peripheral surface of the surrounding wall 42 and the inner cylinder 5. Since the surrounding wall 42 plays a role of a cushion against the transfer charge 8, it is possible to prevent rattling of the transfer charge 8 after the gas generator 100 is assembled. If the surrounding wall 42 was not formed, the igniter assembly has a configuration in which the cup body 21 protrudes from the upper end surface of the collar 3. Then, in assembly of the gas generator 100, it is necessary to directly push the cup body 21 into the inner cylinder 5 filled with the transfer charge 8, and as a result, there is a risk that the transfer charge 8 cracks or the assembly itself becomes difficult. In contrast, the igniter assembly 10 has a configuration in which the surrounding wall 42 surrounds the cup body 21, and it is thus possible to easily assemble the gas generator 100 while suppressing cracking of the transfer charge 8 when assembling the gas generator 100.

As illustrated in FIG. 2, a groove part 44 recessed radially inward circumferentially extends in the middle of the axial direction on the outer peripheral surface of the surrounding wall 42. The groove part 44 has a V-shaped cross-sectional shape opening radially outward by connecting an upper wall 441 inclining upward and radially outward and a lower wall 442 inclining downward and radially outward. A connection area between the upper wall 441 and the lower wall 442 forms a bottom part 443 of the groove part 44. The bottom part 443 is the most radially inward area of the groove part 44, i.e., the most recessed area. By forming the groove part 44, a pair of thick parts 421 and 421 formed on the tip end side and the base end side of the surrounding wall 42 and a thinned part 422 held between the pair of thick parts 421 and 421 and thinner in the radial thickness than the pair of thick parts 421 and 421 are formed on the surrounding wall 42. The thinned part 422 is formed between the bottom part 443 of the groove part 44 and the inner peripheral surface of the surrounding wall 42, and extends circumferentially.

Here, the thinned part 422 is formed in the holding part 4 between a first area P1, including at least a part of the base part 41, and a second area P2, which is an area on the discharge direction side relative to the first area P1, including the tip end of the surrounding wall 42. A broken line B1 illustrated in FIGS. 2 to 5 sections the holding part 4 into the first area P1 and the second area P2 for convenience of explanation, and does not indicate the presence of an interface between the first area P1 and the second area P2. In the present embodiment, the area including the base part 41 and the thick part 421 on the base end side of the surrounding wall 42 constitutes the first area P1, and the thick part 421 on the tip end side of the surrounding wall 42 constitutes the second area P2. In the present embodiment, the "fragile part" is formed as the thinned part 422 between the first area P1 and the second area P2.

Such holding part 4 is formed by injection molding of a resin material in the manufacturing process of the igniter 2. As the resin material for forming the holding part 4, it is possible to preferably use a resin material having, after curing, excellent heat resistance, durability, corrosion resistance, and the like. Examples of such resin material include: thermoplastic resins such as polybutylene terephthalate resin, polyethylene terephthalate resin, polyamide resin, polypropylene sulfide resin, and polypropylene oxide resin; and thermosetting resins such as epoxy resin.

Figure 3:
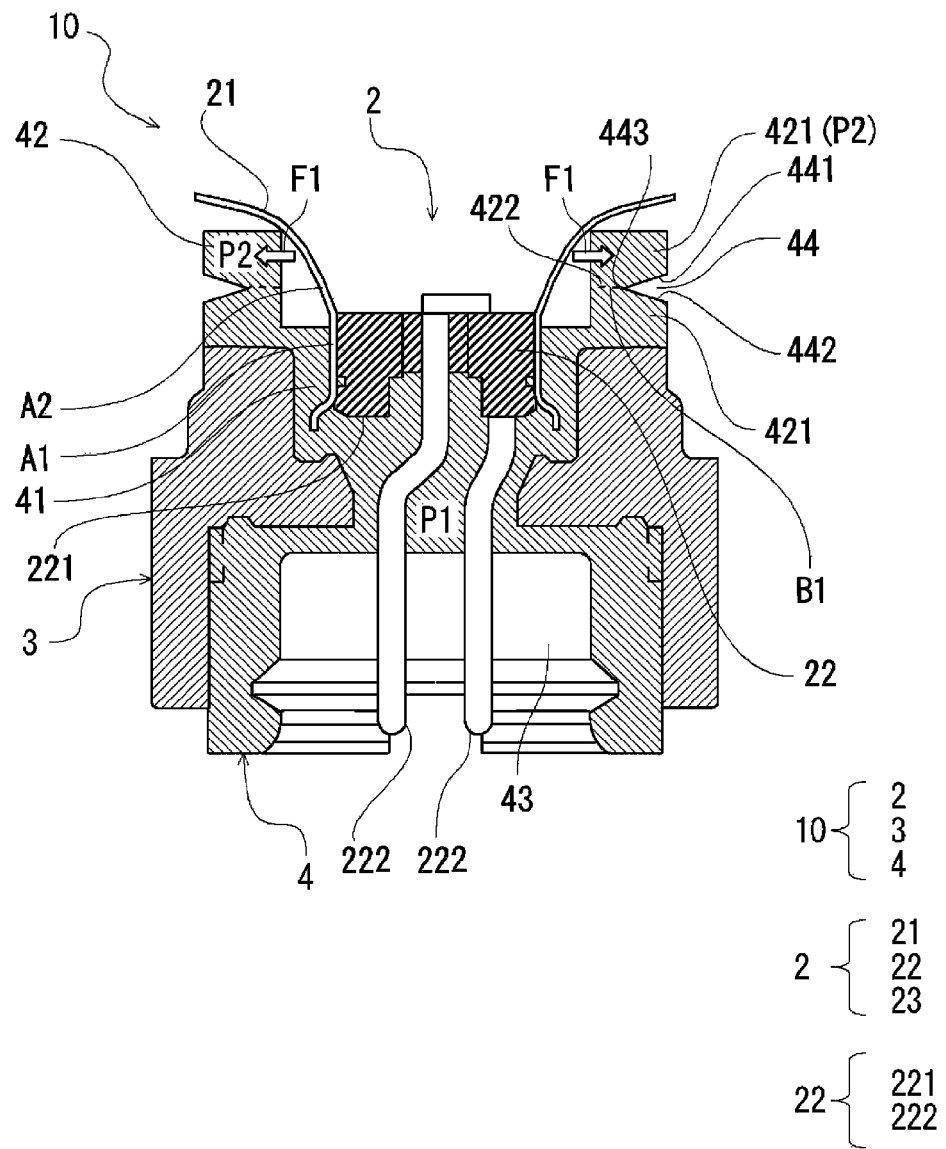
FIG. 3 is a first view for explaining a state when the igniter is operated and a cup body bursts in the igniter assembly according to the first embodiment.
Figure 4:
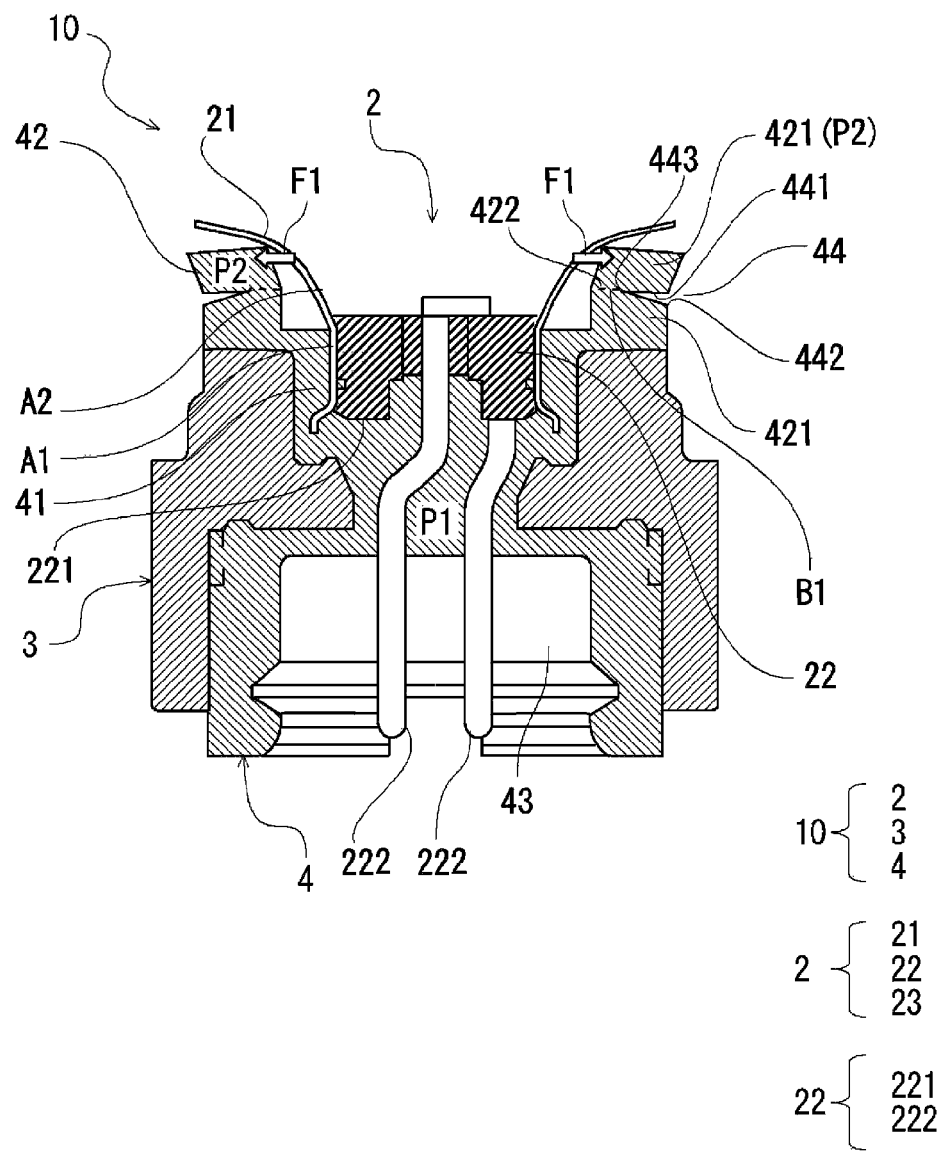
FIG. 4 is a second view for explaining a state when the igniter is operated and the cup body bursts in the igniter assembly according to the first embodiment.
Figure 5:
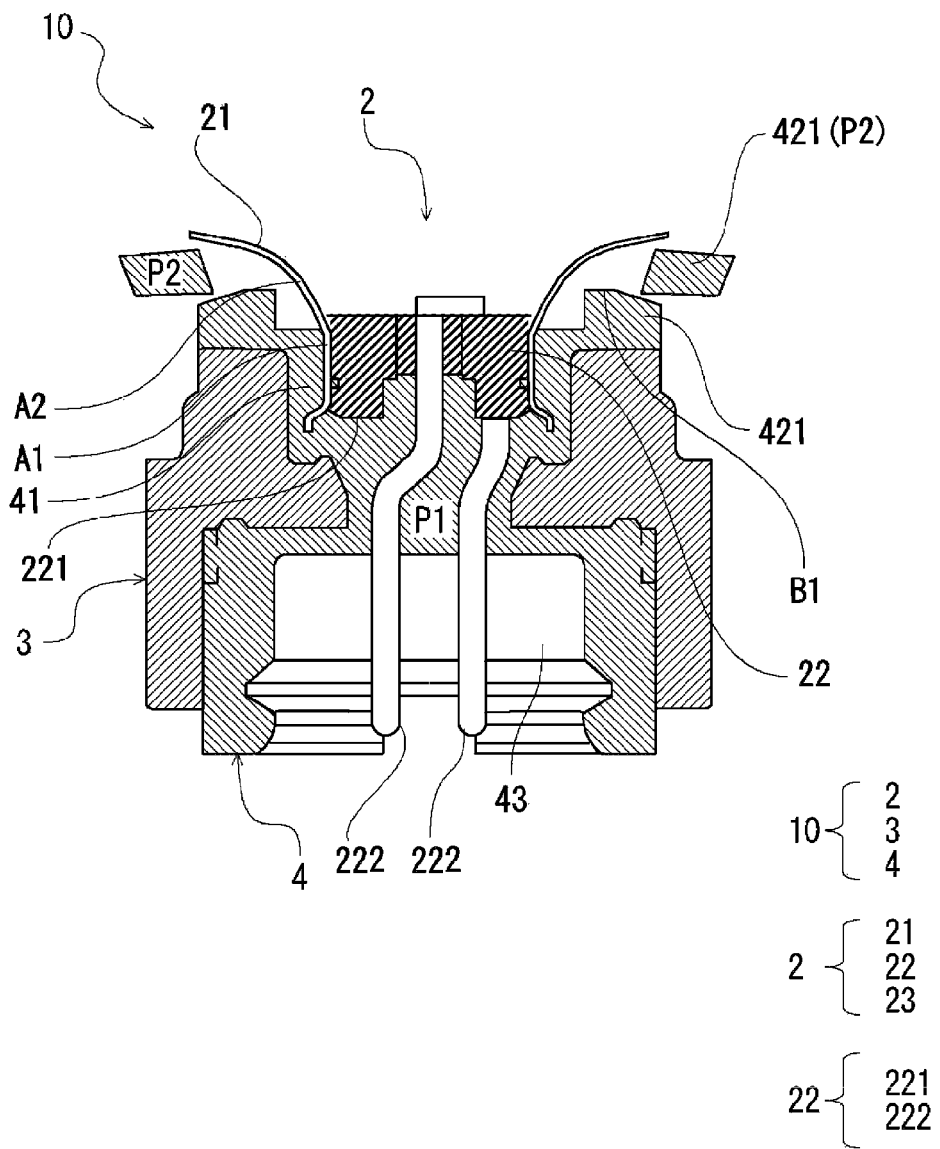
FIG. 5 is a third view for explaining a state when the igniter is operated and the cup body bursts in the igniter assembly according to the first embodiment.

The behavior of the holding part 4 when the igniter 2 is in operation will be described below. FIGS. 3 to 5 are views for explaining a scene of the igniter assembly 10 according to the first embodiment when the igniter 2 is operated and the cup body 21 bursts.

As described above, when the igniter 2 is in operation, the ignition charge in the ignition chamber 50 burns and thus the pressure in the ignition chamber 50 rises, and as illustrated in FIG. 3, the cup body 21 bursts. At this time, the cup body 21 bursts from the center of the lid wall 212 as a starting point. As a result, a flame, which is a combustion product, is discharged upward, and the transfer charge 8 in the transfer chamber 20 is ignited. That is, if it were not for the surrounding wall 42, a space would be formed around the cup body 21 protruding from the upper end surface of the collar 3 to the lid wall side. Since the flame is discharged upward, the transfer charge 8 is positioned at a position off from the discharge direction of the flame with respect to the igniter 2 if the transfer charge 8 is disposed around the radial periphery of the noncontact region A2 of the peripheral wall 211 when the igniter 2 is in operation. As a result, there is a risk that the transfer charge 8 does not sufficiently burn, and unburned charge or combustion delay of the transfer charge 8 is generated. In contrast, in the igniter assembly 10 according to the embodiment, since the surrounding wall 42 functions as a spacer, the transfer charge 8 is prevented from being disposed around the noncontact region A2 of the peripheral wall 211 as illustrated in FIG. 2. This makes it possible to suppress generation of unburned charge and combustion delay of the transfer charge 8 after the igniter 2 is in operation. As a result, it is possible to improve the output performance of the gas generator 100.

As illustrated in FIG. 3, the burst cup body 21 deforms by the pressure in the transfer chamber 20, and thus the noncontact region A2 opens radially outward for the contact region A1 as a base end. Thus, after the igniter 2 is operated, the cup body 21 to open radially outward comes into contact with the surrounding wall 42, thereby applying a load F1 to the surrounding wall 42.

Here, when the igniter 2 is in operation, the holding part 4 deforms by the load F1 applied to the surrounding wall 42, and a crack or breakage may occur in the holding part 4. At this time, if the state of crack or breakage is not preferable, there is a risk of occurrence of defects such as the igniter 2 is not sufficiently held, causing the igniter 2 to be lifted from the holding part 4 or the sealability of the transfer chamber 20 to be impaired (leakage of combustion gas).

In contrast, the igniter assembly 10 according to the present embodiment can suppress the above-described defects by forming the thinned part 422 as a fragile part on the surrounding wall 42, and preferentially deforming the second area P2 by comparison with the first area P1 when a load is applied to the surrounding wall 42. A specific description will be given below.

As illustrated in FIG. 3, in the holding part 4, the thinned part 422 is formed, and thus the contact portion between the burst cup body 21 and the surrounding wall 42 is included in the second area P2. Thus, the cup body 21 comes into contact with the second area P2, and thus a moment due to the load F1 acts on the thinned part 422. As described above, since the thinned part 422 is formed to be thin, the stress generated in the holding part 4 by the load F1 locally increases in the thinned part 422 (stress concentration is generated). This causes the holding part 4 to easily deform more preferentially than another area in the thinned part 422. Specifically, as illustrated in FIG. 4, the second area P2 deforms, and thus the second area P2 falls radially outward for the thinned part 422 as a fulcrum. Then, as illustrated in FIG. 5, a radially extending crack occurs in the thinned part 422, the holding part 4 ruptures, and thus the second area P2 is separated from the first area P1. Thus, in the present embodiment, by forming the thinned part 422 on the surrounding wall 42, the second area P2 can be deformed radially outward more preferentially compared with the first area P1 when the igniter 2 is in operation.

Actions and Effects

As described above, in the igniter assembly 10 according to the present embodiment, the fragile part is formed in the holding part 4 between the first area P1 and the second area P2, and thus when a load is applied to the surrounding wall 42, the second area P2 deforms radially outward more preferentially compared with the first area P1. Thus, the energy due to the load applied to the surrounding wall 42 is easily consumed for the deformation of the second area P2, and thus the first area P1 is suppressed from greatly deforming. As a result, a crack or breakage is suppressed from occurring in the first area P1 when the igniter 2 is in operation. As described above, the first area P1 includes at least a part of the base part 41 for fixing the igniter 2 to the collar 3. Therefore, by suppressing generation of a crack or breakage in the first area P1, it is possible to suppress generation of defects such as lifting of the igniter 2 and reduction in sealability of the transfer chamber 20. As described above, according to the igniter assembly 10 according to the present embodiment, it is possible to suppress a defect caused by an occurrence of a crack or breakage in the holding part 4 for fixing the igniter 2 to the collar 3 when the igniter 2 is in operation.

Note that the second area P2 may be separated from the first area P1 by ductile fracture or brittle fracture. The deformation of the second area P2 may not be accompanied by fracture or rupture as described above.

In the present embodiment, a case in which the fragile part is formed on the surrounding wall 42 as the thinned part 422 has been explained, but the fragile part may be formed in the base part 41. The fragile part is only required to be provided between the first area and the second area. The first area is only required to be an area including at least a part of the base part, and the second area is only required to be an area on the discharge direction side relative to the first area and an area including the tip end of the surrounding wall.

As described above, in the present embodiment, the surrounding wall 42 has the thick part 421 and the thinned part 422 circumferentially extending and having a thickness in the radial direction thinner than the thick part 421 has, and the fragile part is formed as the thinned part 422. Thus, the stress generated in the holding part 4 by the load F1 can be concentrated in the thinned part 422, and the second area P2 can be deformed more preferentially than the first area P1.

As described above, in the present embodiment, the groove part 44 circumferentially extending and radially recessed is formed on the surrounding wall 42, thereby forming the thinned part 422. According to this, since the groove is formed on the surrounding wall 42, when a load is applied to the surrounding wall 42, the surrounding wall 42 easily deforms and thus falls radially outward. As a result, the second area P2 can be preferentially deformed more easily than the first area P1. In the present embodiment, the groove part 44 is formed as a groove recessed radially inward on the outer peripheral surface of the surrounding wall 42, but the technology disclosed in the present application is not limited thereto. That is, the groove part 44 may be formed as a groove recessed radially outward on the inner peripheral surface of the surrounding wall 42.

Figure 6:
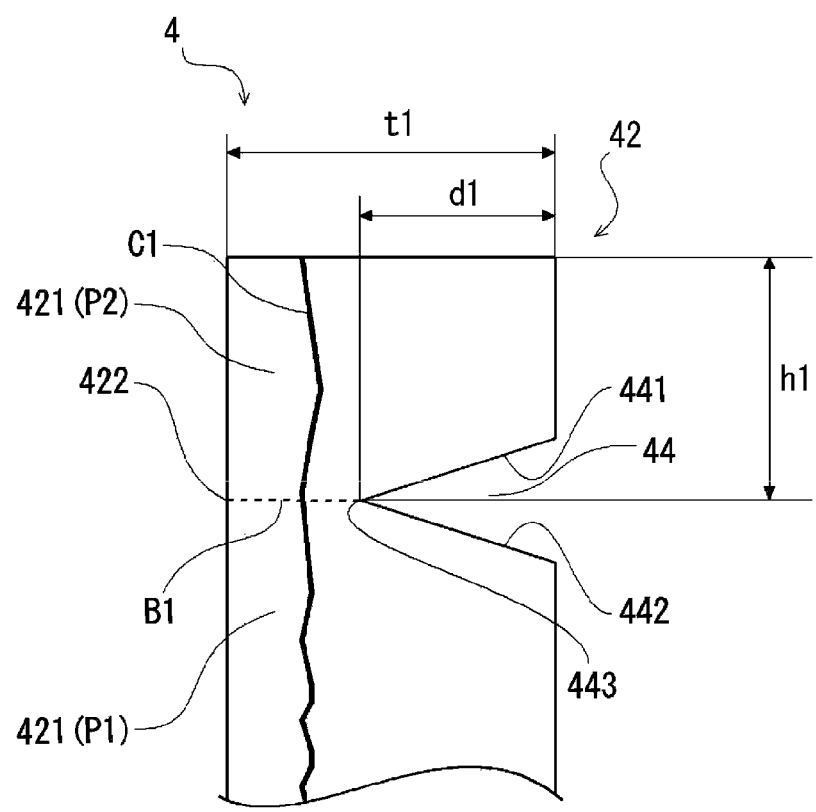
FIG. 6 is a first view illustrating an aspect of a crack when the crack occurs at a second area in the igniter assembly according to the first embodiment.

Here, let the radial thickness of the thick part 421 be t1, and let the radial depth to the bottom part 443 of the groove part 44 be d1 (see FIG. 6). In the case where the thinned part 422 is formed by forming the groove part 44 on the surrounding wall 42 as in the present embodiment, the depth d1 of the groove part 44 is more preferably equal to or greater than ⅓ and equal to or less than ¾ of the thickness t of the thick part 421. By doing so, it becomes easy to deform the second area P2 more preferentially than the first area P1.

Note that the cross-sectional shape of the groove part 44 is not limited to the V-shape described above. The cross-sectional shape of the groove part 44 can be selected from various shapes such as a U-shape, a circular arc shape, a rectangular shape, and a trapezoidal shape.

Here, as illustrated in FIG. 2, an annular gap G1 is formed between the noncontact region A2 and the surrounding wall 42. The size of the gap G1 is formed smaller than that of the transfer charge 8 and thus the transfer charge 8 does not enter the gap G1. Since the gap G1 is formed between the noncontact region A2 and the surrounding wall 42, the impact applied from the cup body 21 to the surrounding wall 42 when the igniter 2 is in operation can be buffered by the gap G1. By the configuration in which the gap G1 (gap formed by the mold disposed at the time of injection molding of the resin material) is formed, it is possible to suppress the injection pressure of the resin material from being directly applied to the peripheral wall 211 of the cup body 21 when the holding part 4 is molded, and it is possible to suppress the cup body 21 from deforming.

[Verification Test]

Figure 7:
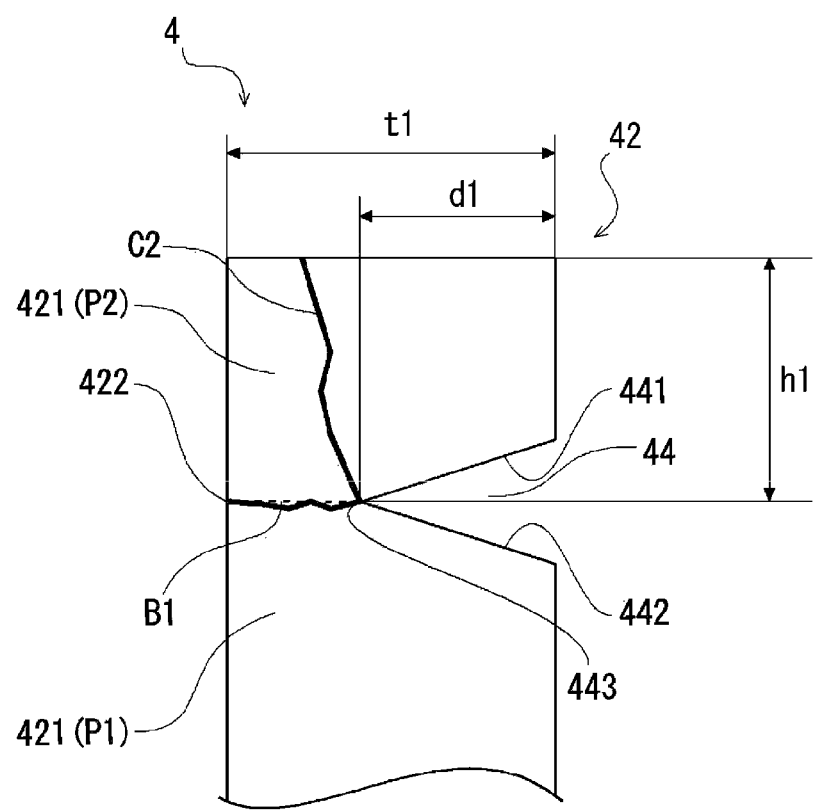
FIG. 7 is a second view illustrating an aspect of a crack when the crack occurs at the second area in the igniter assembly according to the first embodiment.

FIGS. 6 and 7 are views illustrating an aspect of a crack when the crack occurs at the second area P2 in the igniter assembly 10 according to the first embodiment. In the figures, reference numerals C1 and C2 denote cracks. In FIG. 6, the crack C1 axially extending from the tip end of the surrounding wall 42 develops to the base end side relative to the thinned part 422. In FIG. 7, the crack C2 extending axially from the tip end of the surrounding wall 42 does not develop to the base end side relative to the thinned part 422, but develops radially in the thinned part 422. When the second area P2 deforms and a crack occurs in the holding part 4, to prevent the crack from develop in the first area P1, it is more preferable that the crack is generated in the mode illustrated in FIG. 7.

Here, the reference numeral h1 illustrated in FIGS. 6 and 7 represents an axial distance from the tip end surface of the surrounding wall 42 to the bottom part 443, and the depth d1 is, as described above, the radial depth to the bottom part 443 of the groove part 44. The h1 and d1 define the position and depth of the groove part 44.

Next, the verification test conducted to verify change of the mode of the crack when the height h1 and the depth d1 of the igniter assembly 10 according to the first embodiment are changed will be described.

In the verification test, a plurality of igniter assemblies 10 having different h1 and d1 were produced experimentally, and the igniter 2 was actually operated, thereby verifying the mode of the crack generated in the holding part 4. h1 varied to 2.94 mm, 3.14 mm, 3.34 mm, 3.54 mm, 3.64 mm, 3.74 mm, 3.84 mm, 3.94 mm, and 4.04 mm. d1 varied to 2.6 mm, 2.7 mm, 2.8 mm, 2.9 mm, and 3.0 mm. After the igniter 2 was operated, the mode of the crack illustrated in FIG. 6 (case in which the crack reached the base part) was given "Poor", and the mode of a more preferable crack illustrated in FIG. 7 (case in which the crack did not reach the base part) was given "Good". Table 1 shows the result of the verification test.

TABLE 1

| | Height h1 [mm] | | | | | | | | |
|---|---|---|---|---|---|---|---|---|---|
| | 2.94 | 3.14 | 3.34 | 3.54 | 3.64 | 3.74 | 3.84 | 3.94 | 4.04 |
| Depth 2.6 | Poor | Poor | Poor | Poor | Poor | Good | Good | Good | Good |
| d1     2.7 | Poor | Poor | Poor | Poor | Good | Good | Good | Good | Good |
| [mm]  2.8 | Poor | Poor | Poor | Good | Good | Good | Good | Good | Good |
|        2.9 | Good | Good | Good | Good | Good | Good | Good | Good | Good |
|        3   | Good | Good | Good | Good | Good | Good | Good | Good | Good |

[Variation 1]

Figure 8:
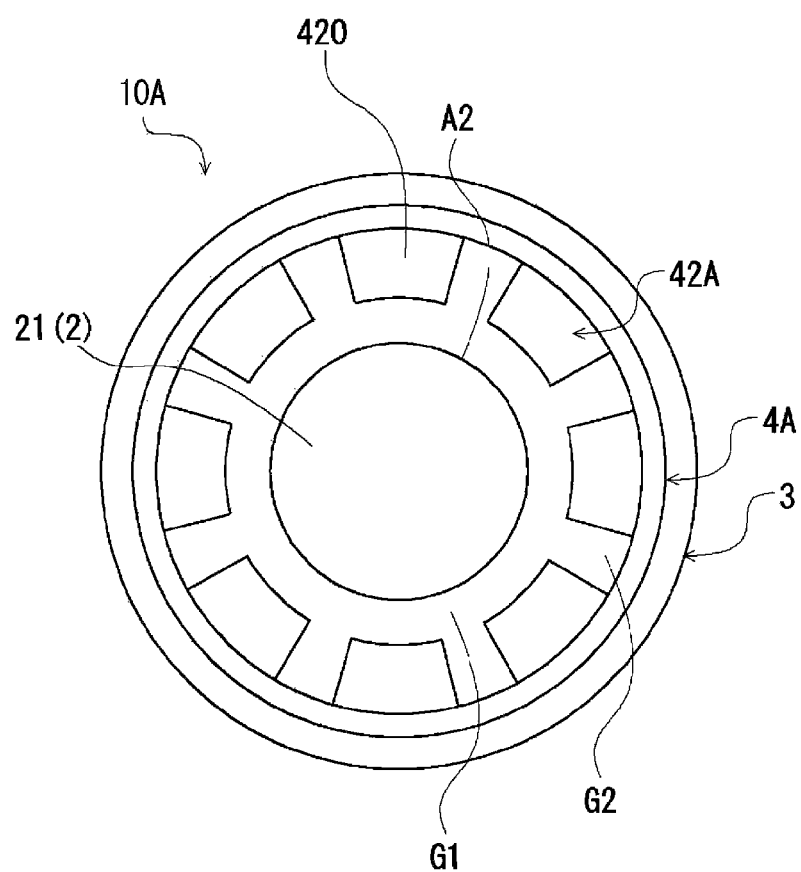
FIG. 8 is a top view of an igniter assembly according to a variation 1 of the first embodiment.

FIG. 8 is a top view of an igniter assembly 10A according to a variation of the first embodiment. In contrast to the igniter assembly 10 illustrated in FIG. 2, where the surrounding wall 42 of the holding part 4 is formed in a continuous annular shape, the igniter assembly 10A according to the variation 1 is different from the igniter assembly 10 in that a surrounding wall 42A of a holding part 4A is formed in an intermittent annular shape. The igniter assembly 10A is otherwise identical to the igniter assembly 10. Hereinafter, the igniter assembly 10A will be described focusing on differences from the igniter assembly 10.

As illustrated in FIG. 8, the surrounding wall 42A is formed by arraying a plurality of intermittent walls 420 in an annular shape at predetermined gaps. The predetermined gap is smaller than the size of the transfer charge 8 and thus the transfer charge 8 does not enter a gap G2 formed between the circumferentially adjacent intermittent walls 420. This prevents the transfer charge 8 from being disposed around the noncontact region A2.

According to the igniter assembly 10A having such holding part 4A, since the surrounding wall 42A is formed of the plurality of intermittent walls 420, the cross-sectional area of each intermittent wall 420 in a cross section orthogonal to the axial direction becomes smaller than the cross-sectional area of the continuously formed surrounding wall 42. This makes each intermittent wall 420 more easily deform than the surrounding wall 42 illustrated in FIG. 2. As a result, when a load is applied to the surrounding wall 42A, the second area P2 can be easily deformed and thus separated from the igniter 2 more preferentially than the first area P1. In this case, it is preferable that the predetermined gap between the circumferentially adjacent intermittent walls 420 is shorter than the circumferential length of one intermittent wall 420, whereby each of the intermittent walls 420 can be more easily deformed. As illustrated in FIG. 8, a plurality of the gaps G2 are formed on the surrounding wall 42A. However, it is not necessary for the predetermined gaps in all the gaps G2 to be identical.

[Variation 2]

Figure 9:
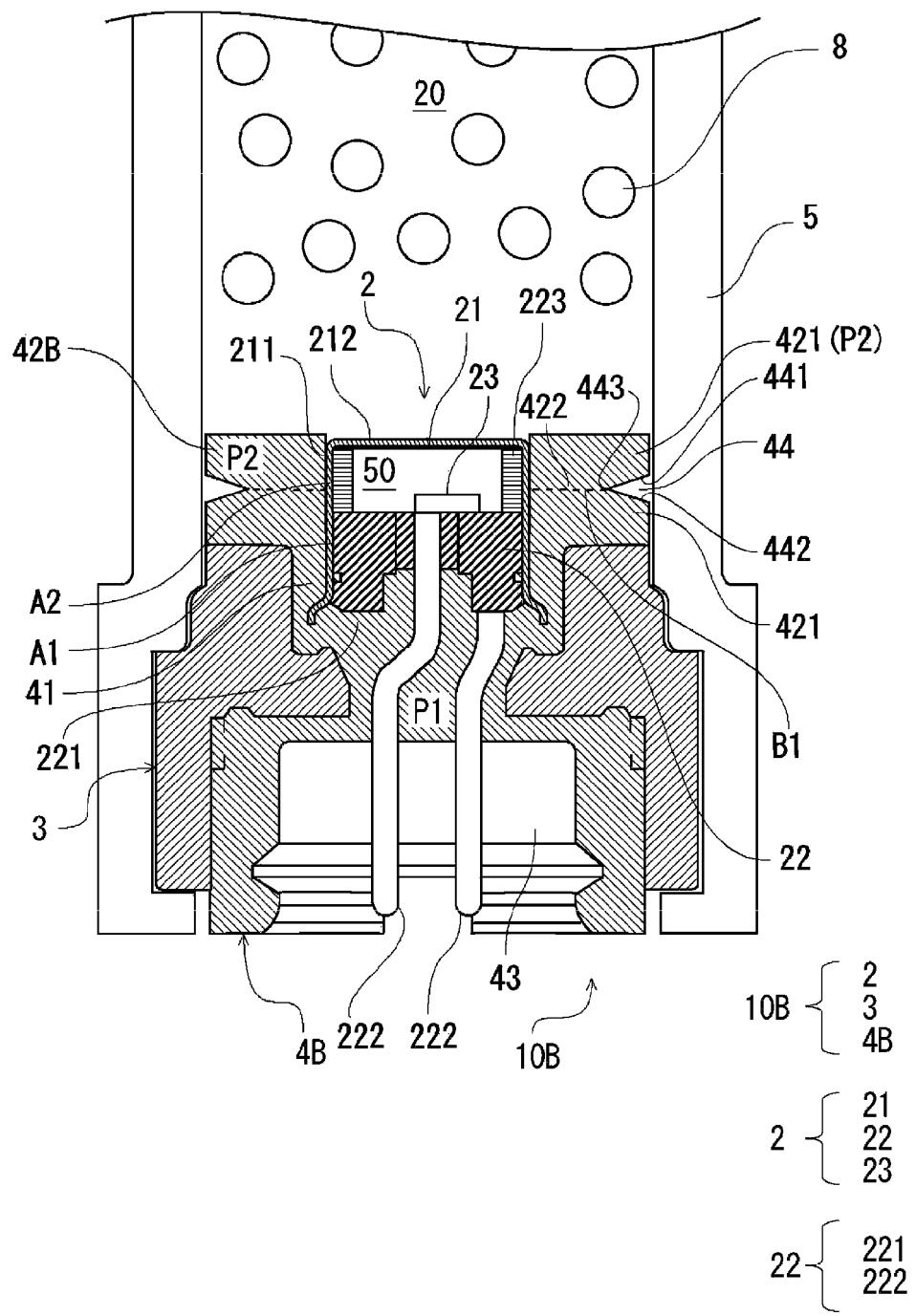
FIG. 9 is a view illustrating a structure of an igniter assembly according to a variation 2 of the first embodiment.

FIG. 9 is a view illustrating the structure of an igniter assembly 10B according to a variation 2 of the first embodiment. As illustrated in FIG. 9, the igniter assembly 10B is different significantly from the igniter assembly 10 illustrated in FIG. 2 in that no gap is formed between the noncontact region A2 and a surrounding wall 42B. In the igniter assembly 10B, a cylindrical charge holder 223 is provided on the upper surface of the metal header 221 in the ignition chamber 50, and the ignition charge is held by the charge holder 223. By providing the charge holder 223, it is preferably suppressed that the cup body 21 deforms due to injection pressure of the resin material at the time of molding a holding part 4B.

Second Embodiment

Figure 10:
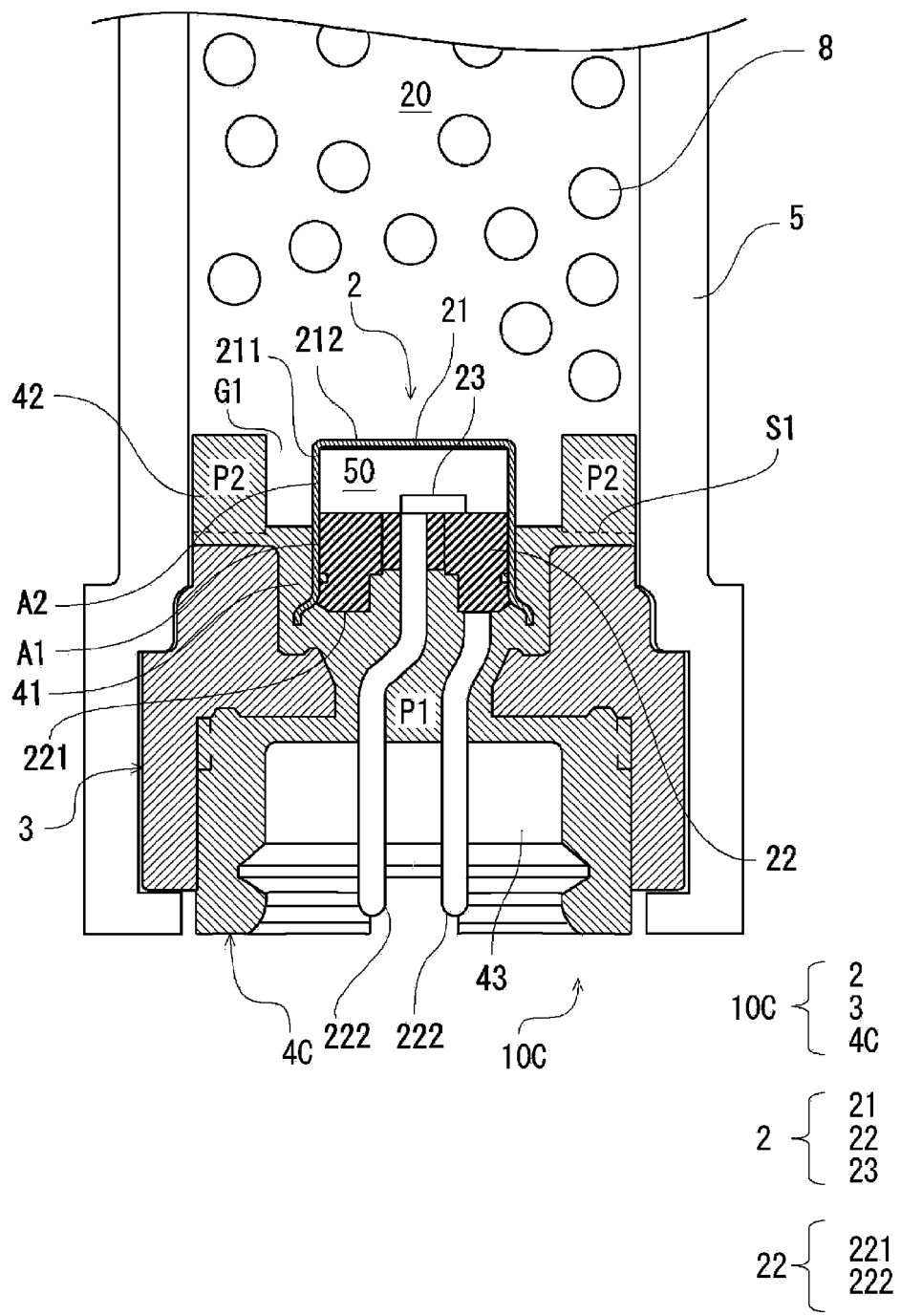
FIG. 10 is a view illustrating a structure near an igniter assembly according to a second embodiment.

FIG. 10 is a view illustrating the structure of an igniter assembly 10C according to the second embodiment of the present disclosure. The igniter assembly 10C according to the second embodiment is different from the igniter assembly 10 according to the first embodiment in that the first area P1 and the second area P2 are formed of resin materials having different curing timings. In the igniter assembly 10C according to the second embodiment, the fragile part is formed as an interface S1 between the first area P1 and the second area P2. Hereinafter, the igniter assembly 10C according to the second embodiment will be described focusing on differences from the igniter assembly 10.

A holding part 4C according to the second embodiment, similarly to the holding part 4 according to the first embodiment, has: the base part 41 for fixing the igniter 2 to the collar 3 by covering the periphery of the contact region A1; and the annular surrounding wall 42 formed continuously to the base part 41 and surrounding the noncontact region A2 with a gap from the noncontact region A2. The holding part 4C according to the second embodiment is sectioned into the first area P1, including a part of the base part 41, and the second area P2 including the tip end of the surrounding wall 42, where the first area P1 is formed of the first resin material and the second area P2 is formed of the second resin material having a slower curing time than the first resin material. The broken line S1 illustrated in FIG. 10 shows an interface between the first area P1 and the second area P2, formed due to different curing timings of the first resin material forming the first area P1 and the second resin material forming the second area P2. As illustrated in FIG. 10, in the present embodiment, the second area P2 is formed in an annular shape including the entire surrounding wall 42 and a part of the base part 41.

Figure 11:
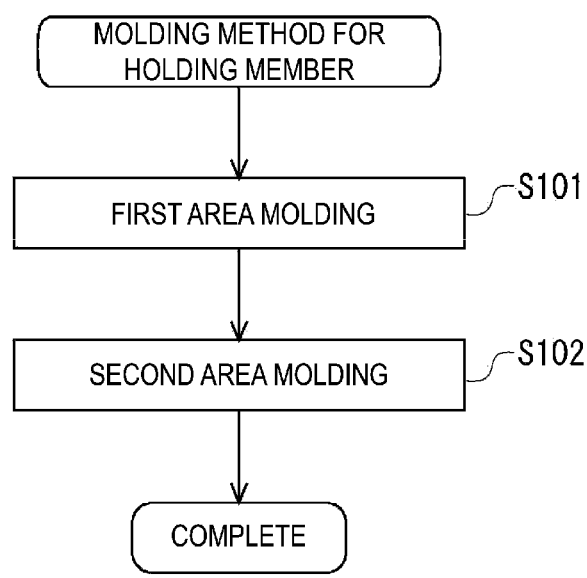
FIG. 11 is a view illustrating a molding method for a holding part according to the second embodiment.

The holding part 4C according to the present embodiment is formed by integrally molding the first area P1 and the second area P2. The molding method for the holding part 4 according to the present embodiment will be described below. FIG. 11 is a view illustrating the molding method for the holding part 4C according to the second embodiment. In the molding method for the holding part 4C according to the present embodiment, the holding part 4C is molded by injection molding using a mold. First, in first area molding in S101, the first area P1 is molded by melting and curing the first resin material. As the first resin material, it is possible to use a thermoplastic resin commonly used for injection molding such as polybutylene terephthalate resin, polyethylene terephthalate resin, polyamide resin, polypropylene sulfide resin, and polypropylene oxide resin. In S101, the igniter 2 is disposed in the mold for molding the first area, and the first resin material in a molten state is poured into the mold and cured. This causes the first area P1 to be molded integrally with the igniter 2.

Next, in second area molding in S102, the second area P2 is molded by melting and curing the second resin material after the first resin material has cured. As the second resin material, similarly to the first resin material, a thermoplastic resin commonly used for injection molding is used. In S102, an intermediate molded object in which the igniter 2 and the first area P1 are integrated is disposed in the mold for molding the second area, and the second resin material in a molten state is poured into the mold and cured. This causes the first area P1 and the second area P2 to be joined to each other, and the holding part 4C is molded integrally with the igniter 2.

In the second embodiment, the interface S1 is formed between the first area P1 and the second area P2 by curing the second resin material after curing the first resin material, i.e., by curing the first resin material and the second resin material at different curing timings. The behavior of the holding part 4C when the igniter 2 is in operation in the igniter assembly 10 including such holding part 4C will be described below.

As described above, when the igniter 2 is operated and the cup body 21 bursts, a flame, which is a combustion product, is discharged upward, and the transfer charge 8 in the transfer chamber 20 is ignited. Here, as illustrated in FIG. 10, also in the igniter assembly 10 according to the second embodiment, similarly to the first embodiment, since the surrounding wall 42 functions as a spacer, the transfer charge 8 is prevented from being disposed around the noncontact region A2 of the peripheral wall 211. This suppresses generation of unburned charge and combustion delay of the transfer charge 8 after the igniter 2 is in operation. As a result, it becomes possible to improve the output performance of the gas generator 100.

Figure 12:
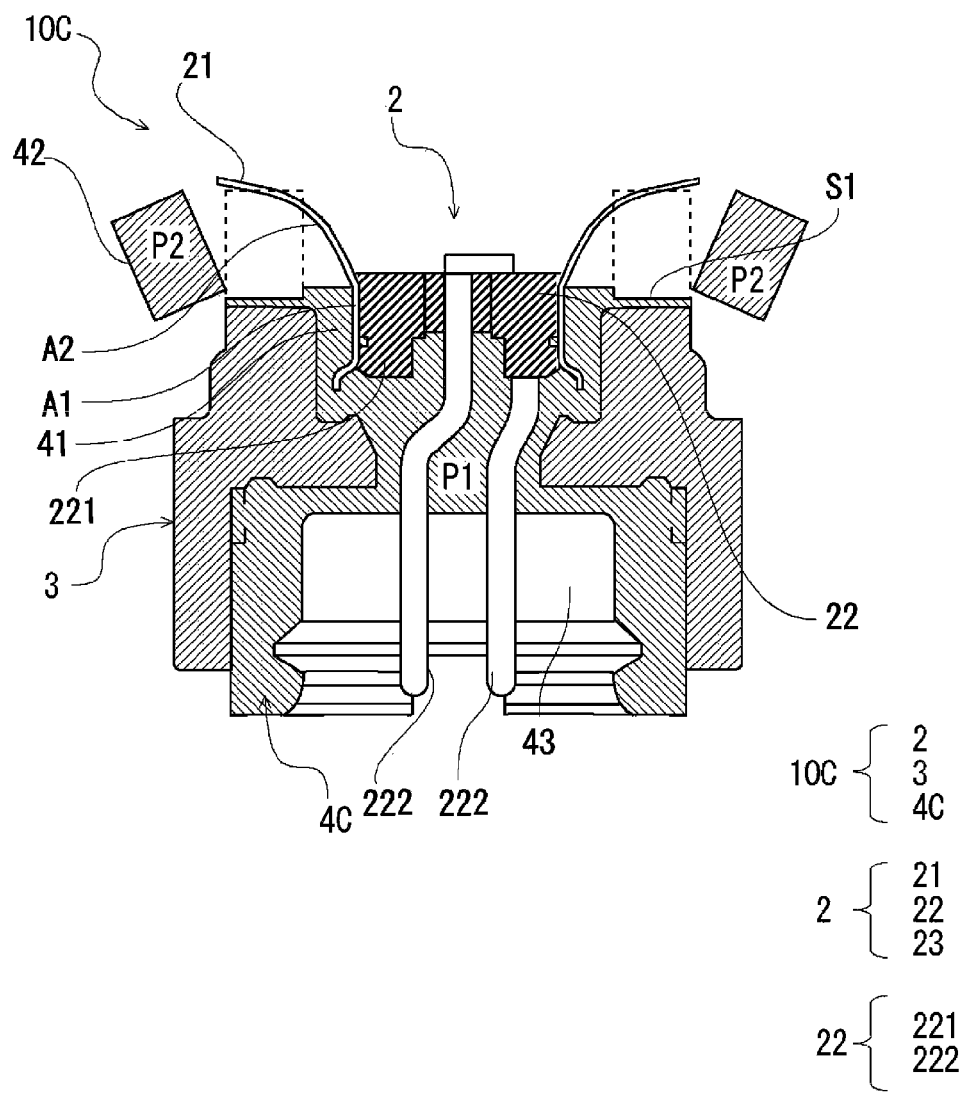
FIG. 12 is a view for explaining a state when the igniter is operated and the cup body bursts in the igniter assembly according to the second embodiment.

FIG. 12 is a view for explaining a state when the igniter 2 is operated and the cup body 21 bursts in the igniter assembly 10C according to the second embodiment. Similarly to the first embodiment, after the igniter 2 is operated, the cup body 21 to burst and open radially outward comes into contact with the surrounding wall 42, thereby applying a load to the surrounding wall 42. Here, in the igniter assembly 10C according to the present embodiment, the interface S1 between the first area P1 and the second area P2 is formed, and thus the contact portion between the burst cup body 21 and the surrounding wall 42 is included in the second area. Therefore, when the load is applied to the surrounding wall 42, a moment due to the load acts on the vicinity of the interface S1. The stress generated in the holding part 4C by the load locally increases in the vicinity of the interface S1 (stress concentration is generated). Thus, the holding part 4C is easy to rupture more preferentially than another area in the interface S1. Specifically, the second area P2 deforms, and thus the second area P2 falls radially outward while being accompanied by separation in the interface S1. Then, as illustrated in FIG. 12, the holding part 4C ruptures, and thus the second area P2 is separated from the first area P1.

As described above, the holding part 4C of the igniter assembly 10 according to the second embodiment is formed with the interface S1, and thus the second area P2 deforms radially outward preferentially compared with the first area P1 when a load is applied to the surrounding wall 42. Thus, the energy due to the load applied to the surrounding wall 42 is easily consumed for the deformation, and thus the first area P1 is suppressed from greatly deforming. As a result, it is possible to suppress generation of a defect caused by an occurrence of a crack or breakage in the first area P1 when the igniter 2 is in operation. In the present embodiment, the "fragile part" is formed as the interface S1 between the first area Pb and the second area P2.

Here, the first resin material preferably has a higher melting point than that of the second resin material. By doing so, in the second area molding described above, the first resin material having cured can be suppressed from melting when the second resin material in a molten state is poured into the mold. As a result, it is possible to form the interface S1 between the first resin material and the second resin material, and it is possible to suppress deformation of the first area P1 due to melting of the first resin material.

Note that the interface S1 between the first area P1 and the second area P2 is not limited to that illustrated in FIG. 10. The entire base part 41 may be the first area P1, and the entire surrounding wall 42 may be the second area P2. The area from the tip end to the middle of the surrounding wall 42 in the holding part 4C may be the second area P2, and the remainder may be the first area P1. The first resin material and the second resin material may be the same type of resin material or may be different types of resin material.

Other Examples

While preferred embodiments of the technology disclosed in the present application have been described above, the various forms described above can be combined as much as possible. For example, also in the second embodiment, as in the first embodiment, the surrounding wall may be formed by a plurality of intermittent walls. The embodiments described above have been explained with an example where the igniter assembly disclosed in the present application is applied to a gas generator in which the gas generating agent 7 is burned via the transfer charge 8 as a combustion agent. However, the igniter assembly disclosed in the present application may be applied to a gas generator in which the igniter burns a gas generating agent not via a transfer charge. In this case, the gas generating agent corresponds to the combustion agent in the present disclosure. Furthermore, in FIGS. 2, 9, and 10, a gap smaller than the size of the combustion agent (transfer charge 8) may be formed between the inner cylinder 5 and the surrounding wall 42 or 42B, and thus the second area P2 is easily deformed outward.

REFERENCE SIGNS LIST

1 Housing
2 Igniter
21 Cup body
211 Peripheral wall
212 Lid wall
22 Closing part
3 Collar
4 Holding part
41 Base part
42 Surrounding wall
421 Thick part
422 Thinned part (one example of fragile part)
44 Groove part
5 Inner cylinder
6 Coolant filter
7 Gas generating agent
8 Transfer charge (one example of combustion agent)
10 Igniter assembly
20 Transfer chamber
30 Combustion chamber
50 Ignition chamber
A1 Contact region
A2 Noncontact region
P1 First area
P2 Second area
S1 Interface (one example of fragile part)

The invention claimed is:

1. An igniter assembly, comprising:
an igniter including an accommodating space for accommodating an ignition charge for igniting a combustion agent;
a collar for supporting the igniter; and
a holding part formed of a resin material for fixing the igniter to the collar,
wherein the igniter includes,
a cup body provided with a peripheral wall having a cylindrical shape and a lid wall for closing one end of the peripheral wall, the cup body being provided such that the lid wall is positioned on a discharge direction side of a combustion product of the ignition charge when the igniter is activated a closing part disposed and thus closing an opening formed at an other end of the cup body, the closing part defining therein the accommodating space together with the cup body,
the peripheral wall is sectioned, in an axial direction of the peripheral wall, into
a contact region in contact with the closing part and
a noncontact region being a region on a side of the lid wall relative to the contact region and not in contact with the closing part,
wherein the holding part includes,
a base part for fixing the igniter to the collar by covering a periphery of the contact region and
a surrounding wall having an annular shape and formed continuously to the base part and configured to prevent the combustion agent from being disposed around the noncontact region by surrounding the noncontact region, wherein the surrounding wall forms a gap having an annular shape, with the noncontact region of the peripheral wall, and a size of the gap is smaller than a size of the combustion agent; and,
a fragile part is formed in the holding part between a first area including at least a part of the base part, and a second area, which is an area on a side of the discharge direction relative to the first area, the second area including a tip end of the surrounding wall, and thus the second area deforms radially outward compared with the first area when a load is applied to the surrounding wall by the igniter being activated.

2. The igniter assembly according to claim 1, wherein
the surrounding wall includes a thick part and a thinned part circumferentially extending and having a thickness in a radial direction thinner than the thick part, and
the fragile part is formed as the thinned part.

3. The igniter assembly according to claim 2, wherein
the surrounding wall is formed by a plurality of intermittent walls arrayed annularly at predetermined gaps in a circumferential direction, and
each of the predetermined gaps is smaller than a size of the combustion agent.

4. The igniter assembly according to claim 2, wherein
the thinned part is formed by forming, on the surrounding wall, a groove part extending along a circumferential direction of the surrounding wall and recessed in the radial direction.

5. The igniter assembly according to claim 4, wherein
the surrounding wall is formed by a plurality of intermittent walls arrayed annularly at predetermined gaps in a circumferential direction, and
each of the predetermined gaps is smaller than a size of the combustion agent.

6. The igniter assembly according to claim 4, wherein
a depth of the groove part in the radial direction is equal to or greater than 1/3 and equal to or less than 3/4 of a thickness of the thick part in the radial direction.

7. The igniter assembly according to claim 6, wherein
the surrounding wall is formed by a plurality of intermittent walls arrayed annularly at predetermined gaps in a circumferential direction, and
each of the predetermined gaps is smaller than a size of the combustion agent.

8. The igniter assembly according to claim 1, wherein
the first area is formed of a first resin material, the second area is formed of a second resin material having a slower curing timing than the first resin material, and
the fragile part is formed as an interface between the first area and the second area.

9. A molding method for a holding part in the igniter assembly described in claim 8, the molding method comprising:
molding the first area by melting and curing the first resin material; and
molding the second area by melting and curing the second resin material after curing the first resin material.

10. The igniter assembly according to claim 8, wherein
the surrounding wall is formed by a plurality of intermittent walls arrayed annularly at predetermined gaps in a circumferential direction, and
each of the predetermined gaps is smaller than a size of the combustion agent.

11. The igniter assembly according to claim 8, wherein
the first resin material has a higher melting point than that of the second resin material.

12. A molding method for a holding part in the igniter assembly described in claim 11, the molding method comprising:
molding the first area by melting and curing the first resin material; and
molding the second area by melting and curing the second resin material after curing the first resin material.

13. The igniter assembly according to claim 1, wherein
the surrounding wall is formed by a plurality of intermittent walls arrayed annularly at predetermined gaps in a circumferential direction, and
each of the predetermined gaps is smaller than a size of the combustion agent.

14. The igniter assembly according to claim 13, wherein
each of the predetermined gaps is shorter than a circumferential length of one of the intermittent walls.

15. A gas generator, comprising:
a housing including therein a gas generating agent; and
the igniter assembly according to claim 1.

* * * * *